United States Patent [19]

Sakatani et al.

[11] Patent Number: 5,126,190

[45] Date of Patent: Jun. 30, 1992

[54] TEXTILE REINFORCED COMPOSITE STRUCTURE OR SPAR

[75] Inventors: Yoshiaki Sakatani; Tetsuya Yamamoto; Shigeru Nishiyama, all of Nagoya; Tetsuro Hirokawa, Omihachiman, all of Japan

[73] Assignees: Mitsubishi Jukogyo Kabushiki Kaisha, Tokyo; Shikishima Boseki Kabushiki Kaisha, Osaka, both of Japan

[21] Appl. No.: 760,308

[22] Filed: Sep. 16, 1991

Related U.S. Application Data

[62] Division of Ser. No. 310,976, Feb. 17, 1989.

[30] Foreign Application Priority Data

Feb. 19, 1988 [JP] Japan .................................. 63-38293
Jan. 19, 1989 [JP] Japan .................................. 1-11033

[51] Int. Cl.⁵ .............................................. D03D 3/00
[52] U.S. Cl. .................................. 428/225; 244/131; 428/902
[58] Field of Search ............... 428/225, 902; 244/131

[56] References Cited

U.S. PATENT DOCUMENTS

| | | | |
|---|---|---|---|
| 4,379,798 | 4/1983 | Palmer et al. ..................... | 428/113 |
| 4,438,173 | 3/1984 | Trost ................................. | 428/225 |
| 4,526,828 | 7/1985 | Fogt et al. ........................ | 428/902 |
| 4,606,961 | 8/1986 | Munsen et al. ................... | 428/902 |
| 4,621,980 | 11/1986 | Reavely et al. .................. | 428/902 |
| 4,671,470 | 6/1987 | Jonas ................................. | 255/119 |
| 4,686,134 | 8/1987 | Ono ................................... | 428/225 |
| 4,725,485 | 2/1988 | Hirokawa .......................... | 428/225 |
| 4,782,864 | 11/1988 | Abildskov ......................... | 428/225 |
| 5,021,281 | 6/1991 | Bompard et al. ................ | 428/902 |

FOREIGN PATENT DOCUMENTS

0258102A2 3/1988 European Pat. Off. .
62-21835 1/1987 Japan .

Primary Examiner—James J. Bell
Attorney, Agent, or Firm—Nikaido, Marmelstein, Murray & Oram

[57] ABSTRACT

Textile structures for producing structural members such as reinforced spars of composite material and a method for producing the textile structures. In the textile structure at least two textile planar members, or plates, are integrally joined together by textile filaments such that the planes of the members intersect each other, at least one member being formed of layers of textile filaments which extend obliquely in at least two directions in a brace fashion with respect to the longitudinal and transverse directions of the member while the remaining members are each formed of layers of textile filaments extending along the longitudinal, transverse and vertical directions of the member.

The textile structures are made by disposing filament guide members of required length in a vertical direction according to a desired configuration and design density of the structures and laying out textile filaments among said filament guide members so that they move longitudinally, transversely or orthogonally to form a plurality of textile planar members. The members are joined together by extracting the filament guide members and inserting filaments in the spaces vacated by the filament guide members.

6 Claims, 10 Drawing Sheets

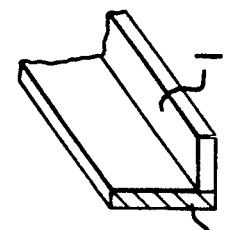
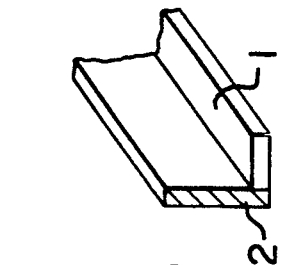
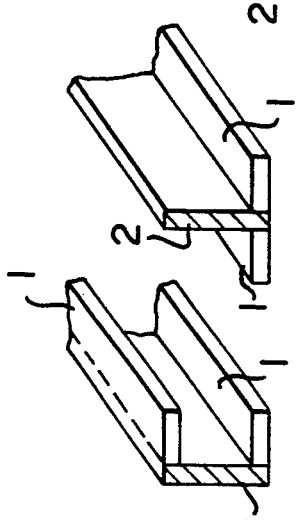
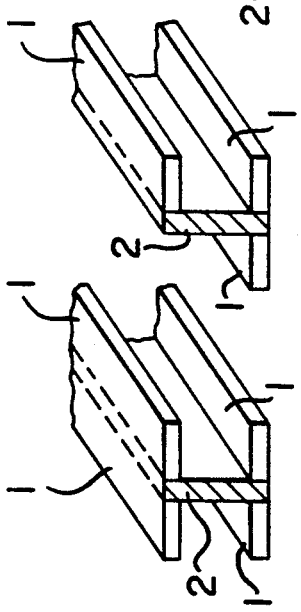

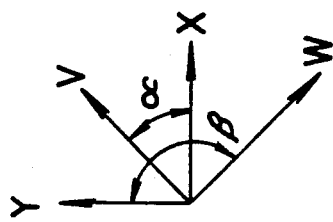
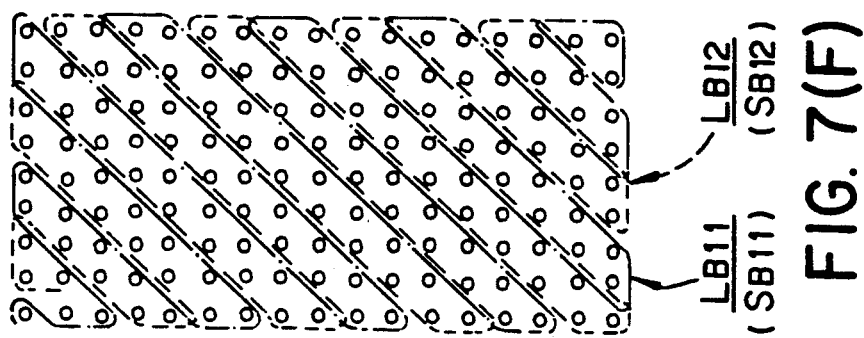
FIG. 7(F)
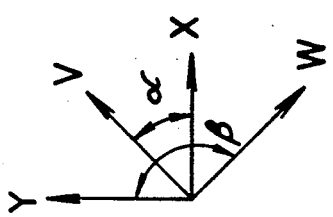
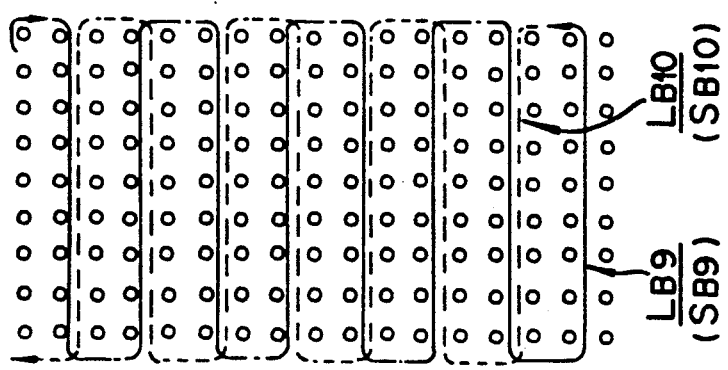
FIG. 7(E)

TEXTILE REINFORCED COMPOSITE STRUCTURE OR SPAR

This is a division, of application Ser. No. 310,976 filed Feb. 17, 1989 is now pending.

BACKGROUND OF THE INVENTION

1. Field of the Invention

The present invention relates to a textile structure for producing structural members such as reinforced spars of composite material, and to a method of producing the same. More particularly, the present invention relates to a textile structure which provides high torsional rigidity to reinforced composite materials such as reinforced spars suitable for use as structural parts for spacecraft, aircraft, automobiles, linear motor cars and the like, and to a method of producing the same. The present application is related to U.S. patent application Ser. No. 07/151,049 filed on Feb. 1, 1988, now U.S. Pat. No. 4,788,101, dated Nov. 29, 1988 wholly incorporated by reference herein.

2. Description of Prior Art

Structural parts such as airplane wings are subjected to high tensile and compressive loads. Fiber-reinforced resin composite materials have begun to be used as raw materials for spars required to have such specific strength. In many cases, spars of fiber-reinforced composite material of this kind have an I-, H-, U-, T-, or L-shaped cross section.

As for textile structures for reinforced composite materials having such cross-sections, Japanese Utility Model Application Laid-Open Specification No. 62-79900 and Japanese Patent Application Laid-Open Specification No. 61-53458 disclose laminated structures of textile filament having a three-dimensional construction of a three-axis orientation type in which textile filaments are laminate along X-, Y- and Z-axes which are orthogonal to each other. Further, Japanese Patent Application Laid-Open Specification No. 62-117842 discloses a base material of I-shaped cross-section in the form of a multilayer fabric opened to assume a three-dimensional configuration.

However, a conventional spar using reinforced members such as described above is constructed such that the laminated structure of textile filament has only a three-dimensional laminated construction of the so-called three-axis orientation type in which the directions of layout of textile filament cross each other. Such a conventional spar exhibits satisfactory strength against tensile, compressive and bending loads acting axially of the textile filaments. However, in the case where the spar has an increased length and when the axial direction of the textile filaments does not coincide with the direction of action of the load, such as when a torsional load is applied, the spar exhibits insufficient strength. As a result, the spar will deform. For example, a fracture or the like may develop due to the inability of a spar to bear the torsional load in a spar used as the main wing or tail assembly of an airplane.

An object of the invention is to provide a textile structure and a method of producing the same which are capable of eliminating the lack of torsional rigidity which has been a problem in spars of fiber-reinforced composite material which use as a reinforcing member a laminated structure of textile filament having a three-dimensional construction of the conventional three-axis orientation type.

SUMMARY OF THE INVENTION

According to the present invention, a textile structure for reinforcing spars of composite material comprises at least two textile planar members, or plates, integrally joined together by textile filaments such that the planes of the members intersect each other, wherein excluding at least one member, the other members are each formed of layers of textile filaments extending along three directions of three axes, i.e., longitudinal, transverse and vertical, of the member, while said at least one member is formed of layers of textile filaments extending obliquely in at least two directions in a brace fashion with respect to the longitudinal and transverse directions, or axes, of the member.

Regarding whether textile filaments should be disposed in said at least one member to extend in all the layout directions of five axes, i.e., in longitudinal, transverse and vertical directions and obliquely in two directions in a brace fashion, or only in some of these directions and as to the proportions of amount of textile filaments extending in the layout directions, selections may be made as desired according to the required specifications, such as strength characteristics, of spars and hence of the textile structures to be produced.

For example, in one form, the at least one member is formed of textile filaments extending in longitudinal, transverse and vertical directions and textile filaments extending obliquely in two directions in a brace fashion. In this case, it is of the five-axis orientation type.

In another form, the at least one member is formed of textile filaments extending in two of the longitudinal, transverse and vertical directions, and textile filaments extending obliquely in a brace fashion in two directions. In this case, it is of the four-axis orientation type.

As yet another form, the at least one member is formed of a textile filament extending in one of the longitudinal, transverse and vertical directions, and textile filaments extending obliquely in a brace fashion in two directions. This is of the three-axis orientation type.

Further, the at least one member may be made in the form of a laminated structure of textile filament of the two-axis orientation type formed solely of textile filaments extending obliquely in a brace fashion in two directions.

A method of producing a textile structure for reinforcing spars of composite material according to the present invention comprises the steps of disposing filament guide members of required length in a vertical direction according to a configuration and design density which are appropriate for the textile structure to be produced, laying out textile filaments among the filament guide members so that they move longitudinally, transversely or orthogonally and zigzag while repeating a combination of these movements, this operation being repeated a required number of times in the vertical direction, extracting the filament guide members, inserting vertical filaments in the extraction-vacated locations to thereby join or integrate a plurality of planar members, or plates, each formed of a laminated structure of textile filament, the method being characterized in that in forming at least one of the members, textile filaments are extended obliquely in at least two directions in a brace fashion with respect to the longitudinal and transverse layout directions of the member.

Functions

At least one of at least two planar members integrally joined together to cross each other is made in the form of a laminated structure of textile filament having a three-dimensional laminated construction including textile filaments which extend obliquely in a brace fashion in two directions and which cross each other; as a result, the strength against torsional loads has been increased. That is, said textile filaments extending obliquely in a brace fashion serve to increase torsional rigidity. Therefore, three of the five layout directions, other than those in which textile filaments extend obliquely in a brace fashion, can be omitted depending upon specifications, thereby contributing to reducing the weight of textile structures and hence the spars.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow, and the accompanying drawings which are given by way of illustration only, and thus are not limitative of the present invention, and wherein:

FIGS. 1(A)–1(E) is a perspective view showing cross-sectional shapes of various textile structures according to the present invention;

FIGS. 7(A)–(H) are plan views of the layout patterns of filament to provide a textile laminated structure of the five-axis orientation type;

DESCRIPTION OF PREFERRED EMBODIMENTS

FIGS. 1(A)–(E) show perspective views illustrating some of the cross-sectional shapes of reinforcing textile structures according to the present invention. A plate 2 (hatched in its cross section) is formed of a laminated structure 2B of textile filament having a three-dimensional laminated construction of a five-axis orientation type. Due to its construction, plate 2 will provide high torsional rigidity against a torsional load acting on a spar, as well as high strength against tensile and compressive loads.

Plates 1 are integrally joined to plate 2 substantially orthogonally thereto, and are each formed of a laminated structure 1A of textile filament having a three-dimensional laminated construction of a conventional three-axis orientation type. Due to the construction of plates 1, they will provide high strength against tensile and compressive loads acting on a spar. Alternatively, plates 1 can be formed of textile filament having a three-dimensional laminated construction of the two-, three-, four- or five-axis orientation type according to the present invention.

Figure 2:
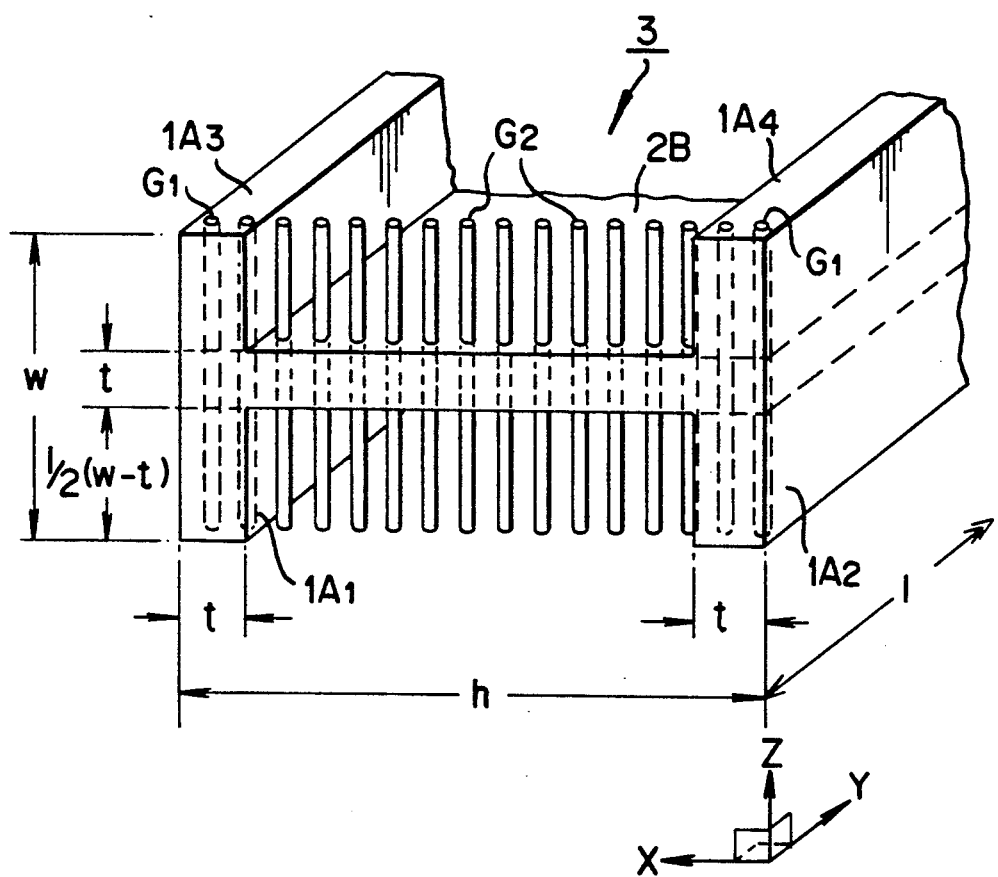
FIG. 2 is a schematic perspective view showing, by way of example, a textile structure having an I-shaped cross section and illustrating the layout position of filament guide tubes.

FIG. 2 is a schematic perspective view showing a textile structure 3 constructed of plates 1 and plate 2. Plate 2 is constructed of a laminated structure 2B of textile filament having a three-dimensional laminated construction of the five-axis orientation type. The four plates 1 provide high tensile and compressive strength due to their laminated structures 1A1, 1A2, 1A3 and 1A4 of textile filament having a three-dimensional laminated construction of the three-axis orientation type. The plates 1 and plate 2 are joined together to form an I-shaped integral construction. FIG. 2 also shows the orientation of filament guide tubes G1, G2 . . . during construction of the textile structure.

Figure 3A:
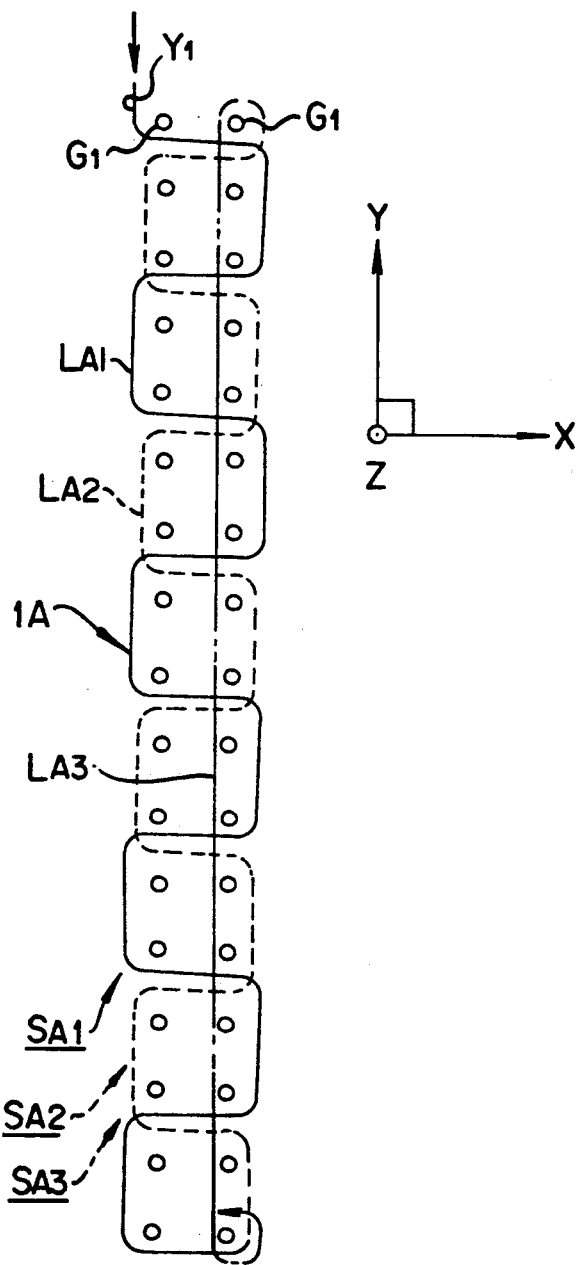
FIGS. 3(A) and (B) are plan views showing the layout pattern of a first textile filament.
Figure 8:
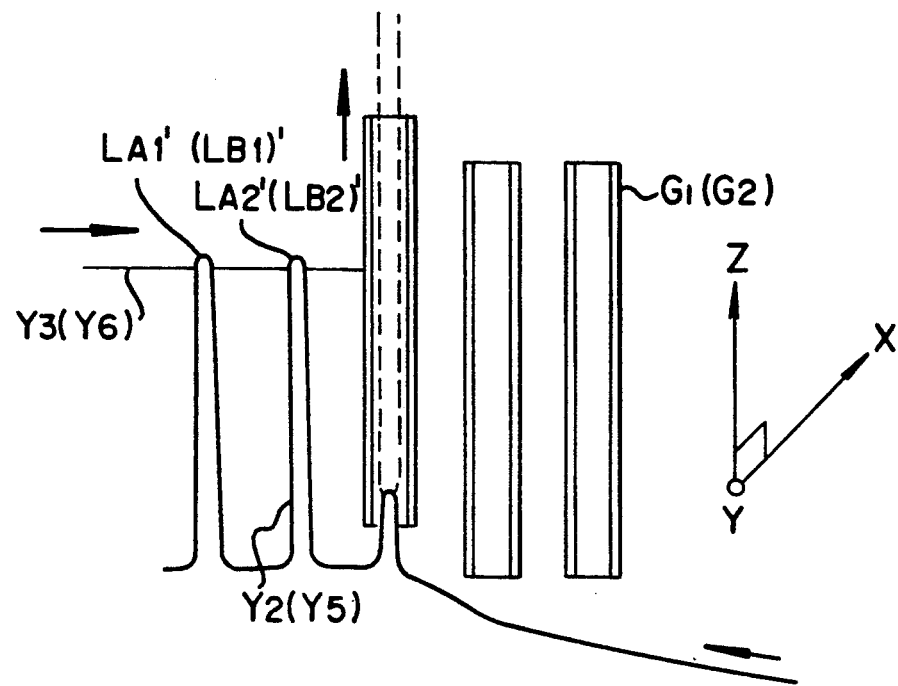
FIG. 8 is an explanatory view of a looped filament being inserted into the vacancies left by filament guide tubes and of another filament serving as a bolt filament.
Figure 9:
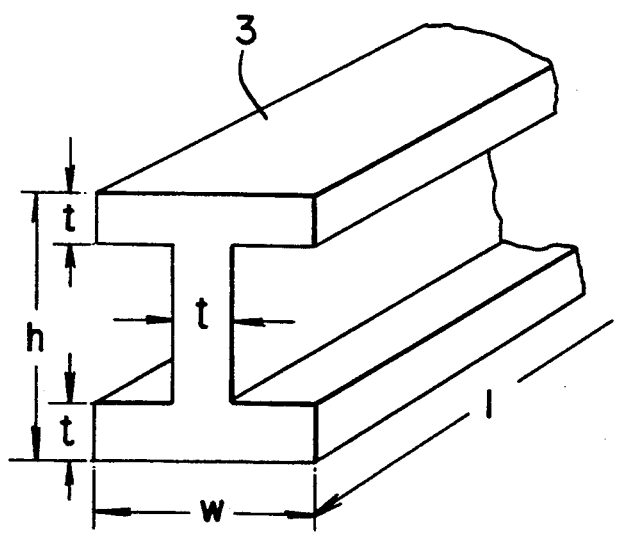
FIG. 9 is an explanatory view showing various dimensions of a textile structure of composite material having an I-shaped cross-section.

FIGS. 3(A) and (B), 4(A) and (B), 5 and 6 are plan views showing the manner in which a first textile filament Y1 is laminated to form various embodiments of the laminated structure 1A of textile filament. FIGS. 7(A)–(H) are top cross-sectional views illustrating the arrangement of a fourth textile filament Y4 in laminated structure 2B. FIG. 8 is a cross-sectional view showing third (and sixth) textile filaments Y3 (and Y6) serving as bolt filaments passed through loops LA1', LA2' . . . (and LB1', LB2' . . . ) formed at the turns of the second (and fifth) textile filaments Y2 (and Y5). FIG. 9 is an explanatory view showing various dimensions of a textile reinforced structure having an I-shaped cross section.

A method of producing the textile structure 3 having an I-shaped cross section according to an embodiment of the present invention and the resulting construction of the textile structure will now be described with reference to FIGS. 2 through 9. The I-shaped textile structure 3 is defined by a height h, a width w, a length l and a thickness t. The I-shaped textile structure 3 is laid on its side as shown in FIG. 2, and can be considered to be an H-shaped textile structure 3. The H-shaped textile structure 3 is constructed of a plate-like member 2 having a width h, a length l and a thickness t, placed flat and four plates 1 each having a width t, a length l and a height $\frac{1}{2}$ (w−t). The plates 1 are erected on the front and back of plate 2 on widthwise opposite edges thereof and throughout its length.

Prior to forming the I-shaped reinforced textile structure 3, first and second filament guide tubes G1 and G2 having a length of approximately w are suitably erected according to a predetermined pattern. Thereafter, the two first laminated structures 1A1 and 1A2 of textile filament underlying the second plate 2 are built by laminating a first filament Y1. Then, the single second laminated structure 2B of textile filament is built by laminating a fourth textile filament Y4. Subsequently, two first laminated structures 1A3 and 1A4 of textile filament overlying the second plate 2 are built. Then a second textile filament Y2 is passed through the first lower and upper laminated structures 1A1, 1A3 and 1A2, 1A4 and through the portion of the second laminated structure 2B positioned intermediate between said first upper and lower laminated structures. A fifth textile filament Y5 is passed through the portion of the second laminated structure 2B excluding its opposite end portions overlapped by the first laminated structures. A third textile filament Y3 as a bolt filament is passed through a loop formed by the second textile filament Y2, taking up the slack of the second textile filament Y2 and tightening the laminate, each time the second textile filament is pulled up to form a loop on the surface of each of the first laminated structures 1A3, 1A4. Similarly, a sixth textile filament Y6 as a bolt filament is passed through a loop formed by the fifth textile filament Y5, taking up the slack of the fifth textile filament Y5 and tightening the laminate, each time the fifth textile filament is pulled up to form a loop on the surface of the second laminated structure 2B. In the manner as described, reinforcing base material for the intended I-shaped spar 3 is formed.

The invention will now be described in more detail. First, the first textile filament Y1 is laminated in the region where said first filament guide tubes G1 are disposed in the order of layout shown in FIGS. 3(A) and (B). That is, the first textile filament Y1 is disposed in a substantially horizontally disposed zigzag pattern in a first layout plane SA1 defined by the X- and Y-axes, thereby forming a first layout layer LA1 of the first textile filament Y1 shown in solid line in FIG. 3(A). Then the layout arrangement is shifted to a second layout plane SA2 overlying the first layout layer LA1. A second layout layer LA2 of the first textile filament Y1 is formed, as shown by the dotted line in FIG. 3(A). Thereafter, the first textile filament Y1 has its layout layer position shifted to a third layout plane SA3 overlying said second layout layer LA2. The first textile filament Y1 is then positioned along the Y-direction as a Y-axis oriented filament in the third layout layer LA3, shown in dash-double-dot-line in FIG. 3(A).

Figure 3B:
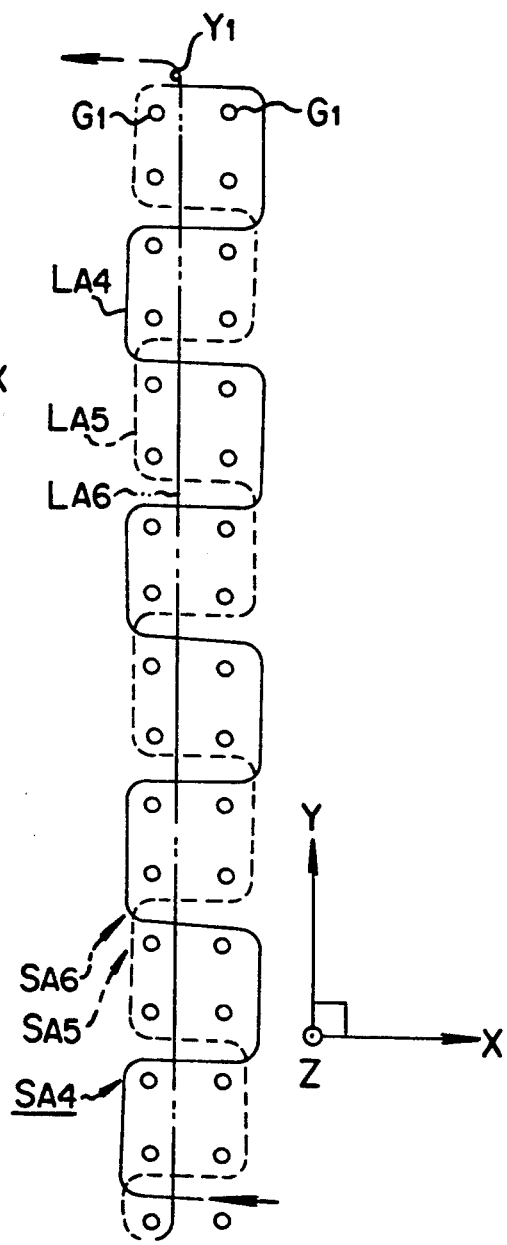

Thereafter, as shown in FIG. 3(B), the first textile filament Y1 has its layout layers shifted step by step in the order of layout layers LA4, LA5 and LA6. Fourth layout layer LA4 is shown as a solid line, fifth layout layer LA5 is shown as a dotted line, and Y-axis oriented filament in a sixth layout layer LA6 is shown as a dash-double-dot line.

In this embodiment, the first and second layout layers LA1 and LA2 and the fourth and fifth layout layers LA4 and LA5 have been formed by moving the first textile filament Y1 alternately along the X- and Y-axes while changing its direction of layout every two first filament guide tubes G1. The third and sixth layout layers LA3 and LA6 have been formed by laying the first textile filament Y1 in the Y-direction between two rows of filament guide tubes G1. However, the layout pattern of the first textile filament Y1 in the XY-plane is not limited to the example shown in FIGS. 3(A) and (B). For example, it can be selected as desired according to the dynamic characteristics required of the first laminated structures of textile filament (hereinafter referred to as the first laminated structures 1A1, 1A2, 1A3 and 1A4).

Figure 4A:
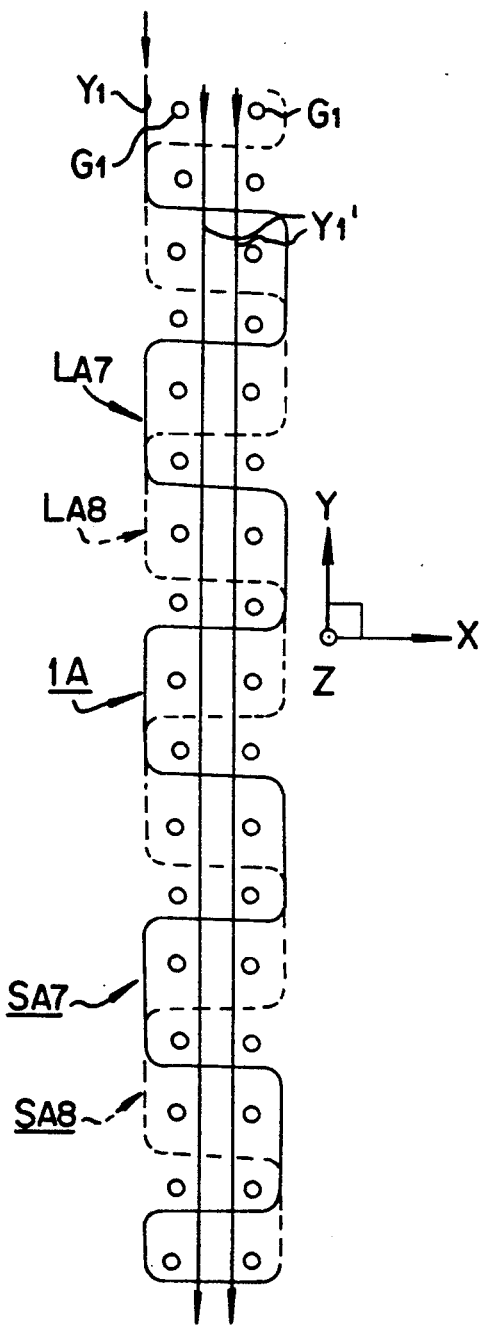
FIGS. 4(A) and (B) are plan views of another embodiment of the layout pattern of the first textile filament.
Figure 4B:
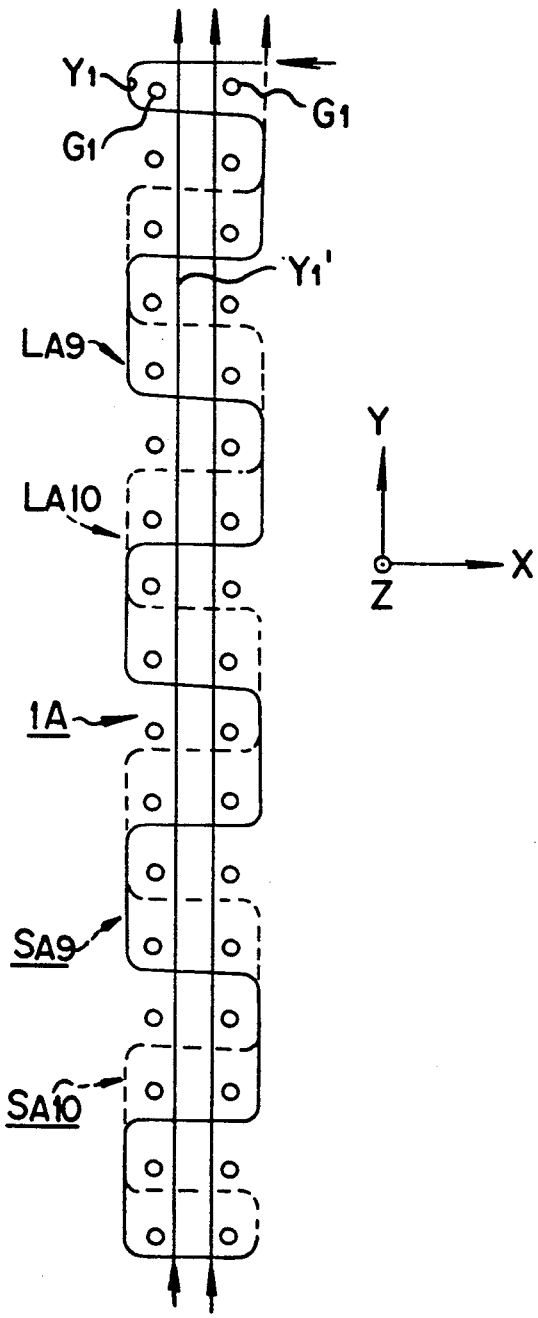

An arrangement of layout shown in FIGS. 4(A) and (B) is used in another embodiment. As compared with the embodiment shown in FIGS. 3(A) and (B), the amount of filament in the Y-axis direction is doubled. That is, in FIG. 4(A), the first textile filament Y1 is used to form layout layers LA7 and LA8 in layout planes SA7 and SA8. Subsequently, two separate filaments Y1' in the Y-axis direction are laid and made taut in parallel, in the direction as indicated by arrowheads, and over layout layer LA8. Further, as shown in FIG. 4(B), the first textile filament Y1 is used to form layout layers LA9 and LA10 in layout planes SA9 and SA10 overlaying the arrangement shown in FIG. 4(A). Finally, separate filaments Y1' are made taut, in the direction indicated by arrowheads opposite to that in FIG. 4(A), in parallel. A series of said operations is repeated until the first laminated structure 1A of textile filament is obtained.

Figure 5:
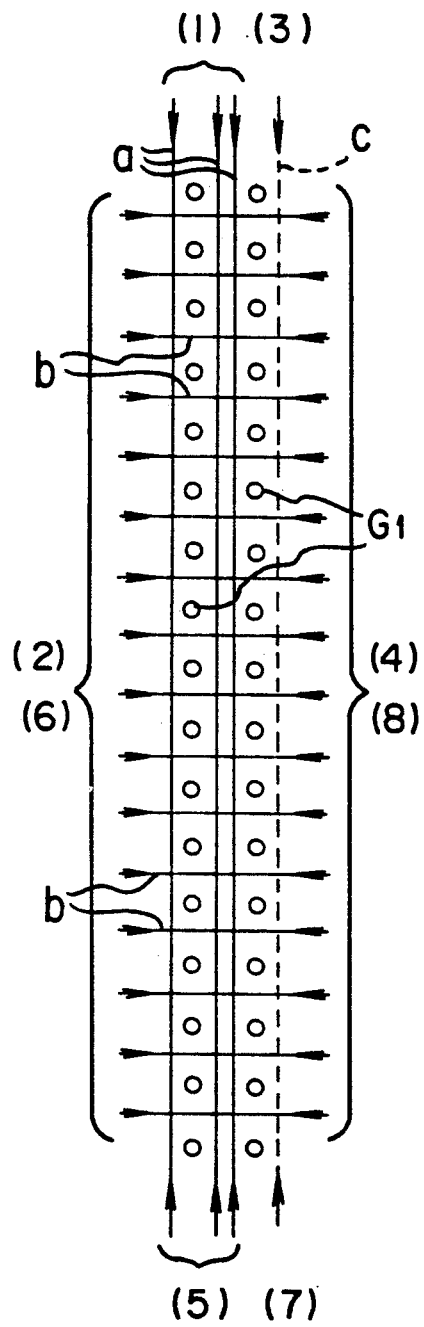
FIG. 5 is a plan view of a further embodiment of the layout pattern of the first textile filament.

Another embodiment of the first textile structure is shown is FIG. 5, wherein the orientation ratio of the number of Y-axis oriented filament to X-axis oriented filament is 3:2. In FIG. 5, three textile filaments a in the Y-axis direction, a plurality of textile filaments b in the X-direction each disposed between adjacent filament guide tubes G1, and a single bolt filament c in the Y-axis direction disposed on a lateral edge are laid in the Y- and X-axis directions in the order (1), (2), (3), (4), (5), (6), (7), and (8). This series of operations is repeated until the desired first laminated structure 1A of textile filament is obtained.

Figure 6:
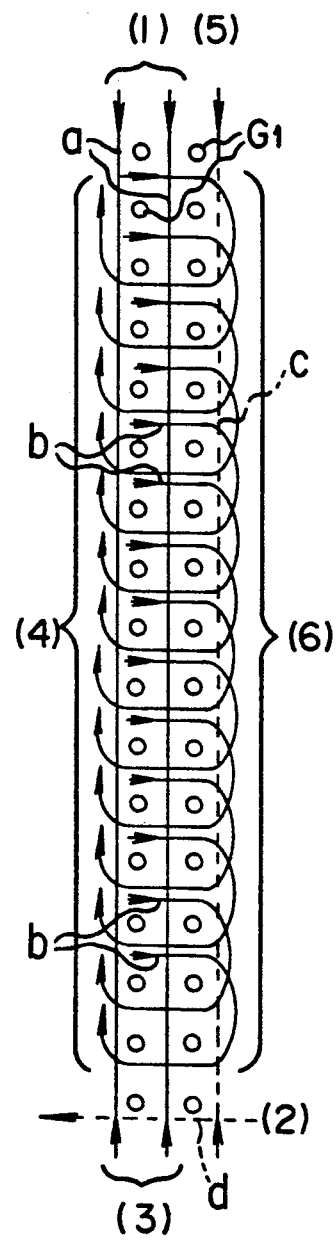
FIG. 6 is a plan view of another embodiment of the layout pattern of the first textile filament.
Figure 7B:
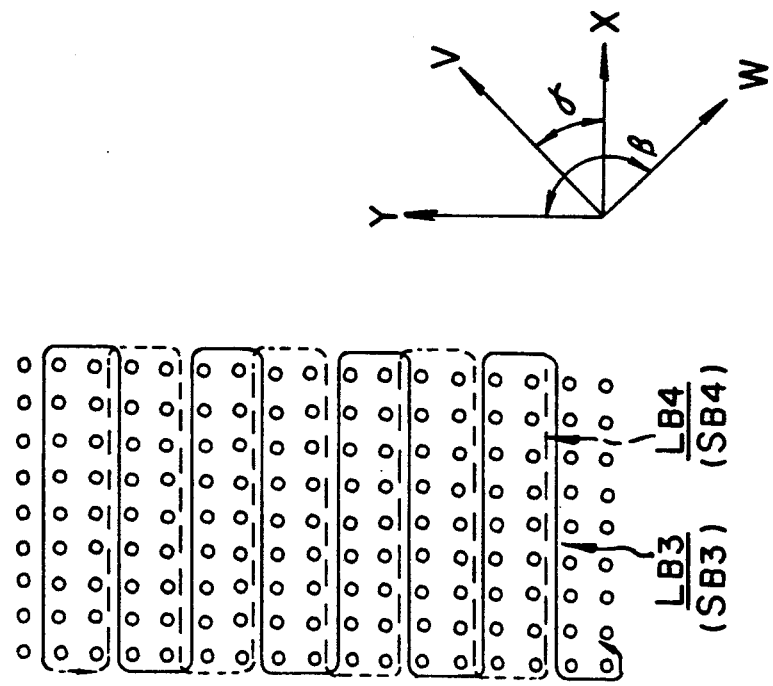
Figure 7A:
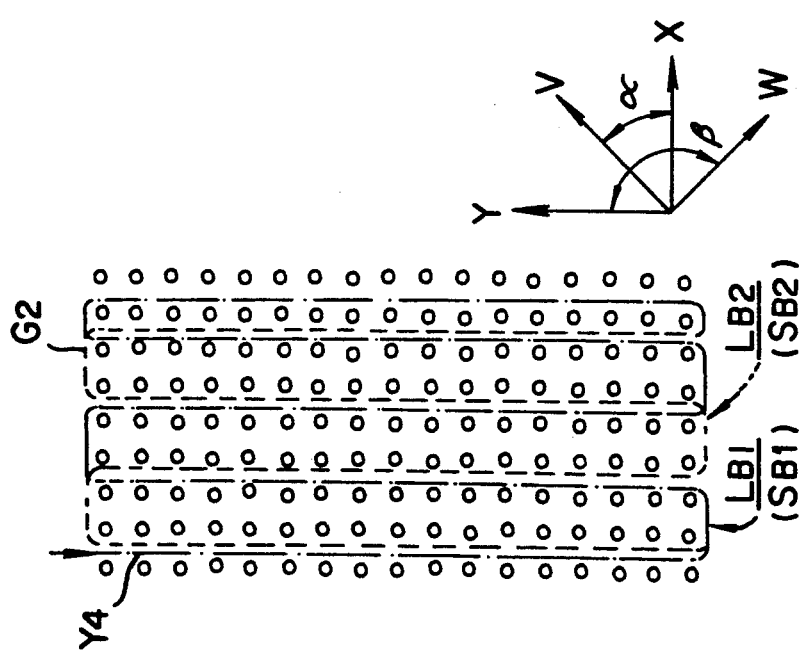
Figure 7D:
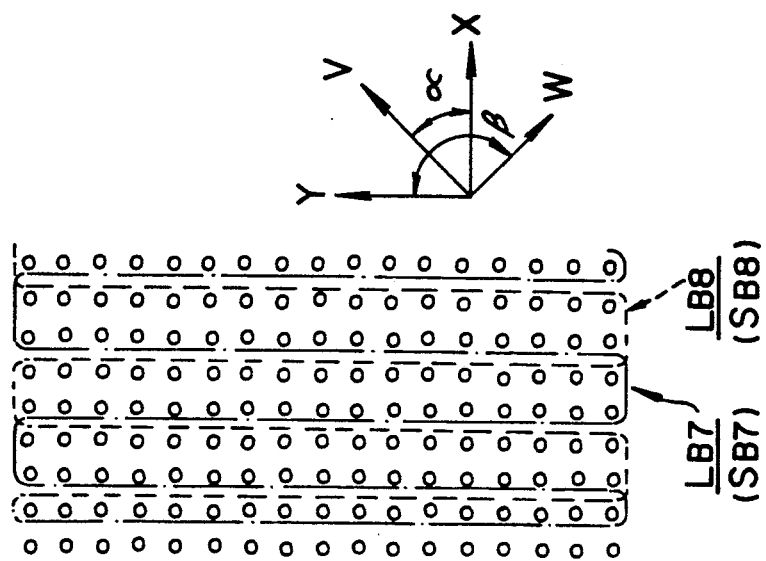
Figure 7C:
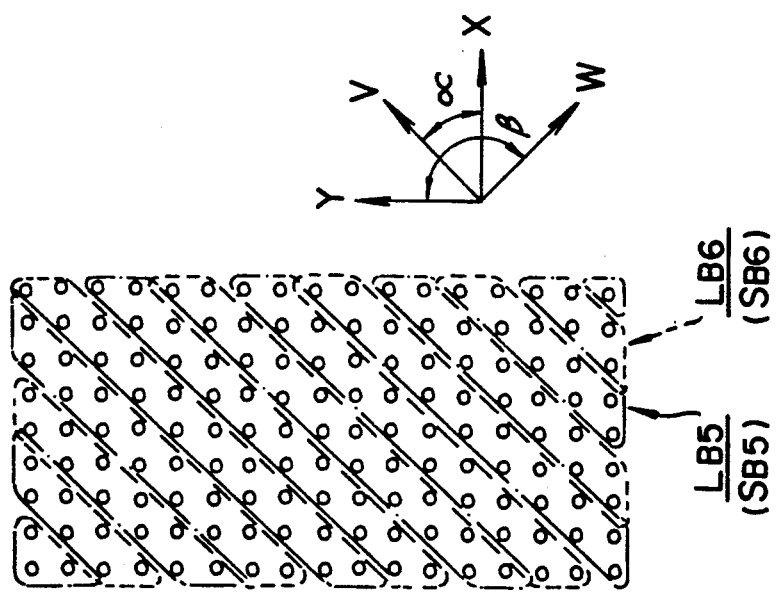
Figure 7H:
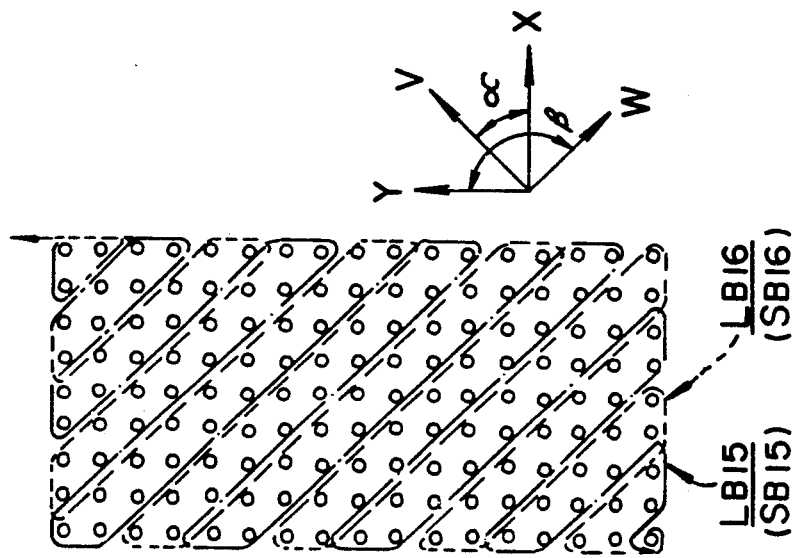
Figure 7G:
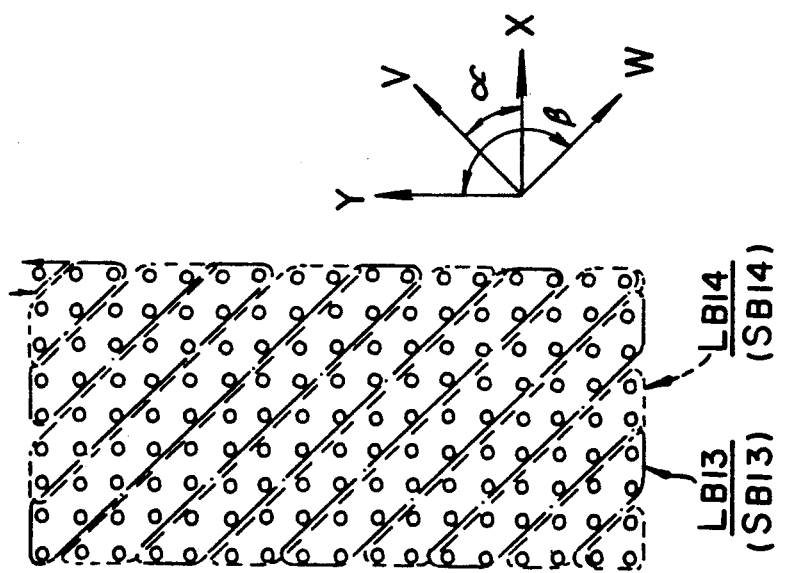

A further embodiment of the first textile structure is shown in FIG. 6, wherein the orientation ratio of Y-axis oriented filament to X-axis oriented filament is 1:1. In FIG. 6, two textile filaments in the Y-axis direction, a plurality of textile filaments a in the X-axis direction each disposed between adjacent filament guide tubes G1, a single bolt filament c in the Y-axis direction disposed on a lateral edge, and a single bolt filament d in the X-axis direction disposed on a lateral edge are laid in the Y- and X-axis directions in the order (1), (2), (3), (4), (5), and (6). This series of operations is repeated until the desired first textile structure 1A is obtained.

The laminating operation with said first textile filament Y1, as shown in FIG. 2, is repeated a required number of times until the two first laminated structures 1A1 and 1A2 of textile filament underlying the second laminated structure 2B of textile filament reach the required height $\frac{1}{2}(w-t)$.

Subsequently, a fourth filament Y4 is laminated in the region of layout of second filament guide tubes G2 as shown in FIGS. 7 (A), (B), (C), (D), (E), (F), (G) and (H). More specifically, the fourth textile filament Y4 is disposed substantially horizontally in a zigzag arrangement in the first layout plane SB1 forming the first layout layer LB1 shown as a solid line in FIG. 7 (A). The layout arrangement is then shifted to the second layout plane SB2 overlying said first layout layer LB1 to form the second layout layer LB2 shown as a dotted line in FIG. 7 (A). Thereafter, the fourth textile filament Y4, as shown in FIGS. 7 (B) through (F) has its layout plane shifted step by step in the order (SB3), (SB4), (SB5) . . . (SB15), (SB16), thereby forming a third layout layer LB3, a fourth layout layer LB4, a fifth layout layer LB5, . . . a fifteenth layout layer LB15 and a sixteenth layout layer LB16 with the direction of layout of textile filament changing successively in the order Y-axis, X-axis, V-axis, Y-axis, X-axis, V-axis, W-axis, W-axis.

The laminating operation of the fourth textile filament Y4 is repeated a number of times required for the second laminated structure 2B of textile filament to obtain the predetermined thickness t, as shown in FIG. 2. In addition to the arrangement wherein a single textile filament is caused to travel, as illustrated and described, it is also possible to use separate textile filaments for the individual axes.

In this embodiment, the layout pattern of the second filament guide tubes G2 has been determined so that the V-axis forms a phase angle of 45° with respect to the X-axis and so that the W-axis forms a phase angle of 135° with respect to the Y-axis. However, the phase angle and layout pattern of the fourth textile filament Y4 are not limited to the examples shown in FIG. 7 (A) through (F) and may be selected as desired according to the dynamic characteristics required of the second laminated structure 2B and hence the textile structure 3.

When it is desired to provide a construction for supporting tensile and compressive loads by the plates 1 and torsional stress solely by the plate 2 according to dynamic characteristics, this can be attained either by performing lamination in zigzag patterns alone as shown in FIGS. 7 (C), (F), (G) and (H) while omitting the disposition patterns in which the filament is parallel or orthogonal to the plate axis as shown in FIGS. 7 (A), (B), (D) and (E), or by changing the laminating proportions. A plate 2 resulting from the omission of the parallel and orthogonal patterns is a three-axis orientation type three-dimensional textile structure. This design decreases the amount of reinforcing filament, thus contributing much to weight-saving. Many other modified patterns can be employed without departing from the scope of the invention. In the second laminated structure 2B, a vertical filament to be later described can be omitted, but in that case the self-holdability developed upon completion of lamination is low and hence it is desirable to use a suitable tool resembling a molding tool or other jigs, so as to prevent the structure from losing shape.

The laminating operation of the fourth textile filament Y4 is repeated a number of times required for a desired thickness of the second laminated structure 2B as shown in FIG. 2.

When the thickness of the second laminated structure 2B reaches the predetermined value, the laminating operation on the two first laminated structures 1A3 and 1A4 overlying the same is started. The order of layout of the first filament Y1 in the first textile structures 1A3 and 1A4 is the same as that of the first textile filament Y1 used in the first textile structures 1A1 and 1A2 shown in FIG. 3 (A) or (B) or FIGS. 4 through 6, and hence a further description thereof is omitted.

Subsequently, as shown in FIG. 8, the first filament guide tubes G1 are pulled up one by one toward the upper surface of the first textile structure 1A3. At this time the second textile filament Y2 is bent to form loops LA1', LA2'... which are drawn into the filament guide tubes by leading wires or other suitable hooking tools. Each time a loop of the second textile filament is exposed on the upper surfaces of the first laminated structures 1A3 and 1A4 formed of the first textile filament Y1, the third textile filament Y3 serving as a bolt filament is inserted into the loop and the filament Y2 is pulled back, taking up the slack of the second textile filament Y2 and tightening the laminated structure.

Likewise, the second filament guide tubes G2 are pulled up one by one toward the upper surface of the second laminated structure 2B while the fifth textile filament Y5 having loops LB1', LB2'... formed at the turns thereof is drawn upwardly through the plurality of layout layers by the lower ends of the second filament guide tubes G2 each provided with a filament catch (not shown). Each time a loop of the fifth textile filament is exposed on the upper surface of the second laminated structure 2B formed of the fourth textile filament Y4, the sixth textile filament Y6 serving as a bolt filament is inserted and the filament Y5 is pulled back, taking up the slack of the fifth textile filament Y5 and tightening the laminated structure. This operation is performed with respect to the filament guide tubes G1 and G2 to respectively integrate the laminated structures 1A1 and 1A3 and the portion of the laminated structure 2B interposed therebetween and the laminated structures 1A2 and 1A4 and the portion of the laminated structure 2B interposed therebetween and finally integrate the single laminated structure 2B.

The laminated structure of textile filament obtained is impregnated with epoxy resin serving as a matrix and then cured, whereby a reinforced textile composite structure 3 of I-shaped cross-section as seen in FIG. 9 is produced.

In one embodiment of the present invention, a textile structure 3 having a long length can be formed and then cut into desired lengths for application.

In the embodiments described above, carbon fiber filaments can be selected for use as the first through sixth textile filaments Y1-Y6, while epoxy resin can be selected for use as the matrix. As for other textile filaments, besides carbon fiber, it is possible to select graphite fiber, glass fiber, aramid fiber, ceramic fiber, alumina fiber, aromatic polyester fiber or mixtures of these and other fibers. Also, various other types of known resins can be substituted for the epoxy resin.

The textile structure for reinforcing spars of composite material according to the present invention comprises at least two planar members, or plates, integrally joined together to cross each other, at least one of said members being formed of a five-axis, four-axis, three-axis or two-axis orientation type three-dimensional laminated structure of textile filament. Thus, a spar using it as a reinforcing base material and impregnated with a matrix which is subsequently cured and serving as a reinforcing base material is capable of exerting high, practically satisfactory rigidity to resist not only tensile and compressive loads but also torsional load. And by selecting the textile filament layout direction and laminating density which agree with the type and direction of load, it is possible to satisfy the requirement for weight-saving intended for spars while retaining the required torsional rigidity. Further, according to the production method of the invention, said textile structures for reinforcing spars can be easily produced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A textile structure for reinforcing spars, said structure having at least two textile filament planar members integrally joined together by textile filaments of said members such that the planes of said members intersect each other, at least one member of said planar members being formed of layers of textile filaments extending obliquely in at least two directions in a brace fashion with respect to said at least one member, the other members of said members each being formed of layers of textile filaments extending in X, Y and Z directions, respectively, of each said other members.

2. The textile structure of claim 1, wherein in said at least one member of said planar members, said textile filaments extend in mutually perpendicular planes extending in X, Y and Z directions, respectively, in said at least one member, and obliquely in at least two directions in a brace fashion with respect to XY, XZ and YZ planes, said textile filaments thus extending along planes having at least five axes.

3. The textile structure of claim 1, wherein in said at least one member of said planar members, said textile filaments extend in two of mutually perpendicular planes extending in X, Y and Z directions, respectively, in said at least one member, and obliquely in at least two direction in a brace fashion with respect to XY, XZ and YZ planes, said textile filaments thus extending along four axes.

4. The textile structure of claim 1, wherein in said at least one member of said planar members, said textile filaments extend in one of mutually perpendicular planes extending in X, Y and Z directions, respectively, and obliquely in at least two directions in a brace fashion with respect to one of XY, XZ and YZ planes, said textile filaments thus extending along three axes.

5. The textile structure of claim 1, wherein in said at least one member of said planar members, said textile filament extend obliquely in at least two directions in brace fashion with respect to one of the XY, XZ and YZ planes defining said member, said textile filaments thus extending along two axes.

6. The textile structure of claim 1, wherein said textile filaments extending obliquely in at least two directions form a phase angle of 45° with respect to longitudinal and transverse directions.

* * * * *